Figure 1:
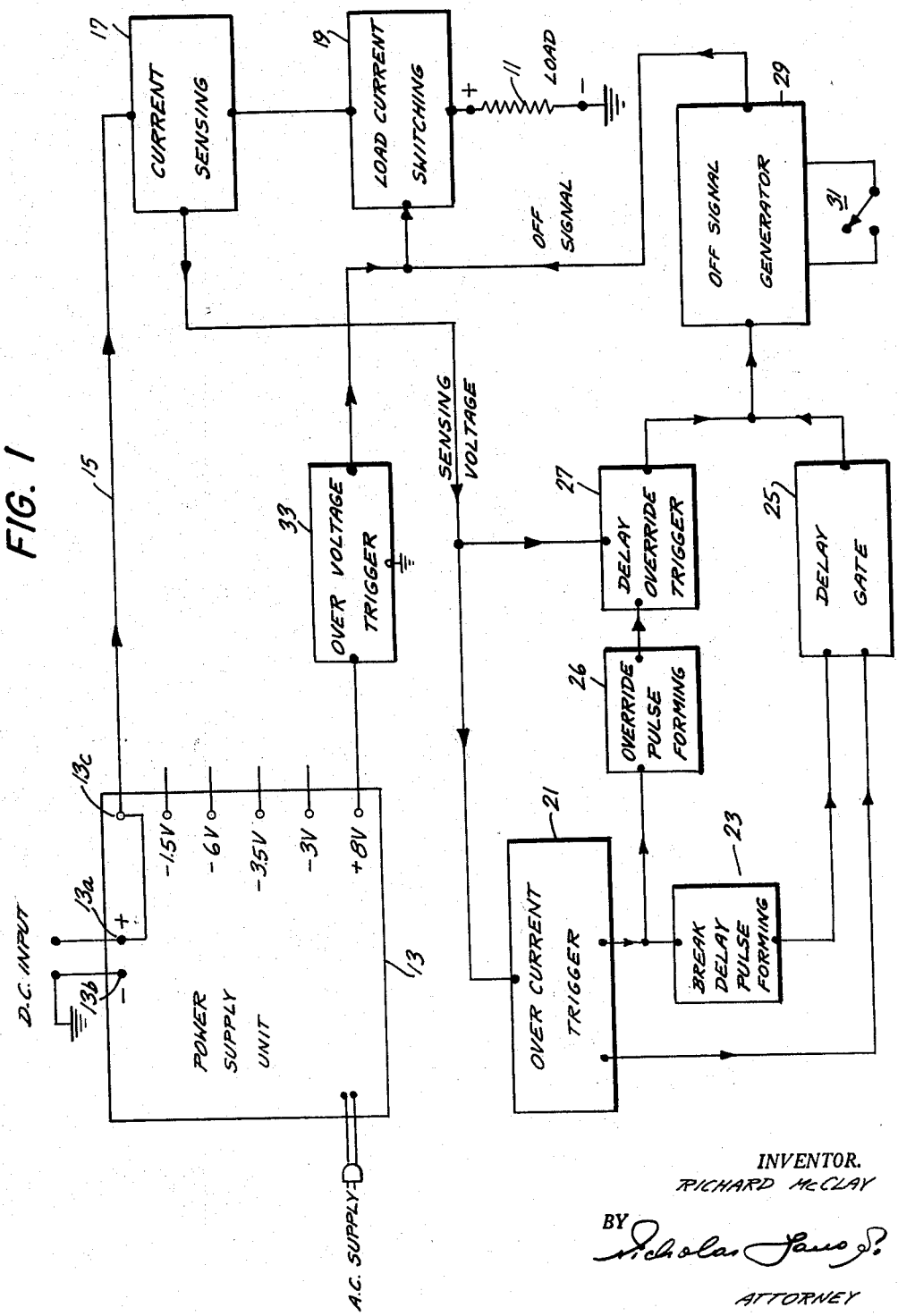

Sept. 1, 1964 R. L. McCLAY 3,147,400
TRANSISTOR CIRCUIT INTERRUPTING DEVICE
Filed Nov. 1, 1960 3 Sheets-Sheet 1

INVENTOR.
RICHARD McCLAY
BY
ATTORNEY

INVENTOR.
RICHARD McCLAY 3,147,400
TRANSISTOR CIRCUIT INTERRUPTING DEVICE
Richard Larry McClay, Los Angeles, Calif., assignor to
P. R. Mallory & Co., Inc., Indianapolis, Ind., a corporation of Delaware
Filed Nov. 1, 1960, Ser. No. 66,492
6 Claims. (Cl. 317—22)

This invention pertains to transistor circuits, and particularly to a transistorized high speed static circuit interrupting device for protecting transistor and other sensitive circuitry from voltage and current overloads and short circuits.

The high sensitivity and rapid response of transistor circuits to changes in the operating voltage or current with which they are supplied makes them unusually susceptible to damage from momentary voltage or current overloads. Depending on the magnitude of the overload condition, permanent damage may result within an interval as short as a few ten-thousandths of a second. An adequate overload protective device for such circuits must therefore be capable of far more rapid detection and interruption of an overload condition than is possible with mechanical or thermal circuit breakers and fuses.

Accordingly, an object of the invention is to provide a transistorized static circuit interrupting device which may be adjusted to interrupt the current supplied to a load when it remains above any of a wide range of selectable overcurrent levels for longer than a prescribed delay interval which may be adjusted from about 100 microseconds to about 100 milliseconds.

A further object is to provide a transistorized static circuit interrupting device which will automatically interrupt load currents which remain above a predetermined maximum safe overcurrent level for longer than a prescribed safe interval even though the device may be set to permit a longer interval for more normal overcurrents.

A further object is to provide a transistorized static circuit interrupting device which provides almost immediate overvoltage protection for the load in addition to delayed overcurrent protection.

A further object is to provide a transistorized static circuit interrupting device which may be set at will to either automatically reclose a preset interval after each circuit interruption or to maintain the interrupted condition until manually permitted to reclose.

Briefly, a transistorized static circuit interrupting device in accordance with the invention is adapted to interrupt the current supplied to a load whenever it remains above a prescribed overcurrent level for longer than a prescribed delay interval. In one embodiment the device comprises a load current supply circuit for connecting the load to a direct current input source, current sensing means being included in the current supply circuit to produce a sensing voltage proportional to the load current. It further comprises transistor triggering circuit means coupled to the current sensing means and adapted to produce a trigger pulse whenever the sensing voltage has remained at a level exceeding that corresponding to the prescribed overcurrent level for longer than the prescribed delay interval. Transistor signal generating circuit means are coupled to the triggering circuit means and respond to each trigger pulse produced thereby to generate an overcurrent switching voltage which continues for a preset period subsequent thereto. Finally, normally conductive transistor switching circuit means are included in the load current supply circuit and coupled to the signal generating means, such switching circuit means being adapted to be rendered nonconductive by the switching voltage so as to open the load current circuit and maintain interruption of the load current during the preset period of that voltage.

A further feature of the invention is that the triggering circuit means may also be adapted to produce an override trigger pulse whenever the sensing voltage has remained at a level exceeding that corresponding to a maximum safe overcurrent level for longer than a prescribed safe interval. The override trigger pulse is then just as effective as the normal trigger pulse produced on normal overcurrents in causing the switching circuit means to open the load current circuit.

An interrupting device in accordance with the invention may also comprise further transistor triggering circuit means coupled to the load current supply circuit and responsive to the voltage across the input source to generate an overvoltage switching voltage so long as the source voltage remains above a prescribed overvoltage level. Means coupled to the further triggering circuit means may be provided for applying the overvoltage switching voltage to the switching circuit means so as to render it nonconductive, thus interrupting the load current for the duration of that voltage.

A special feature of the signal generating means comprised in the circuit interrupting device is that it may include manually operable means adapted to be selectively set to either of two states of which in one it causes the signal generating means to continuously regenerate the overcurrent switching voltage, thereby continuously maintaining the load current interruption until such manually operable means is set to its other state.

Figure 2A:
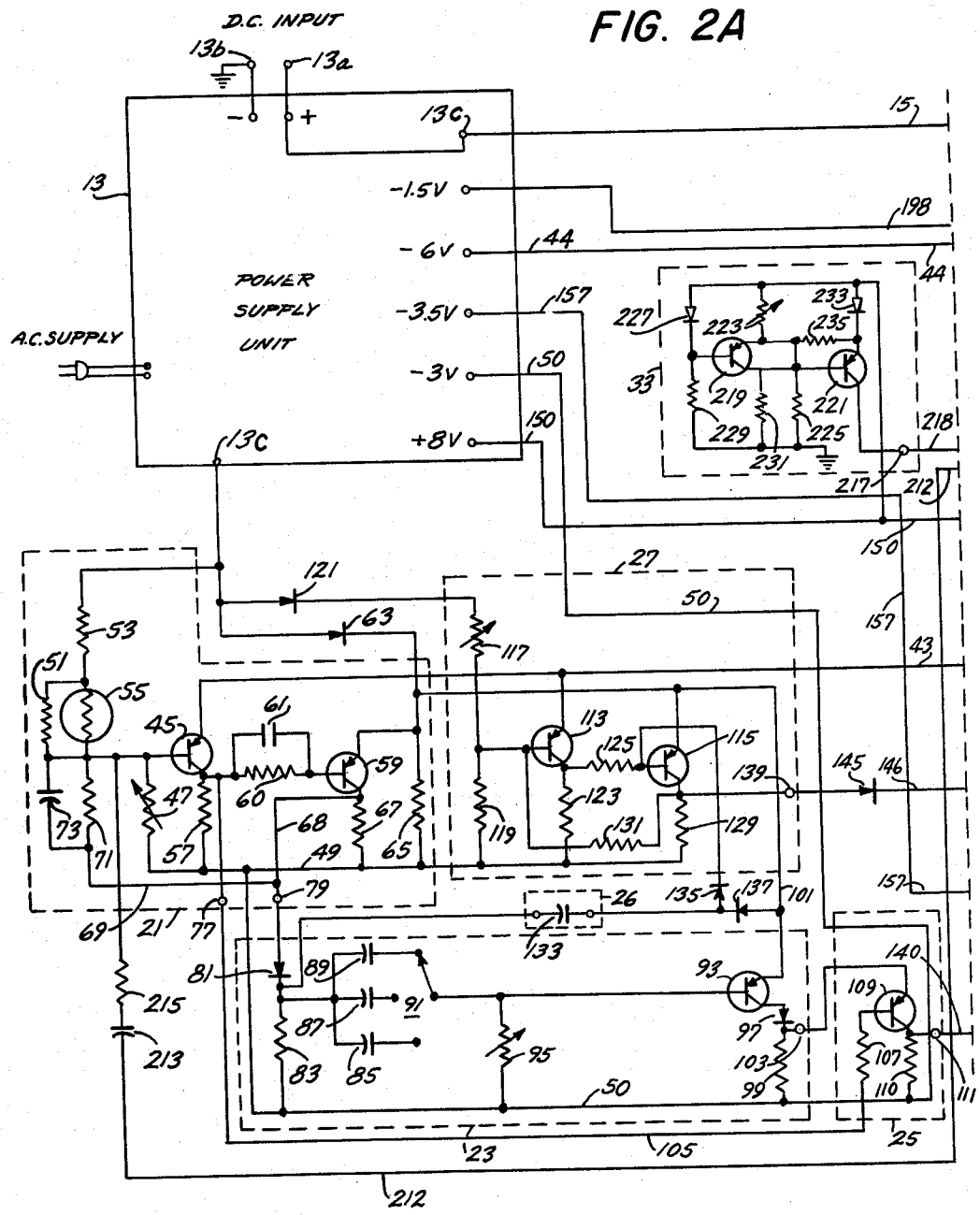
Figure 2B:
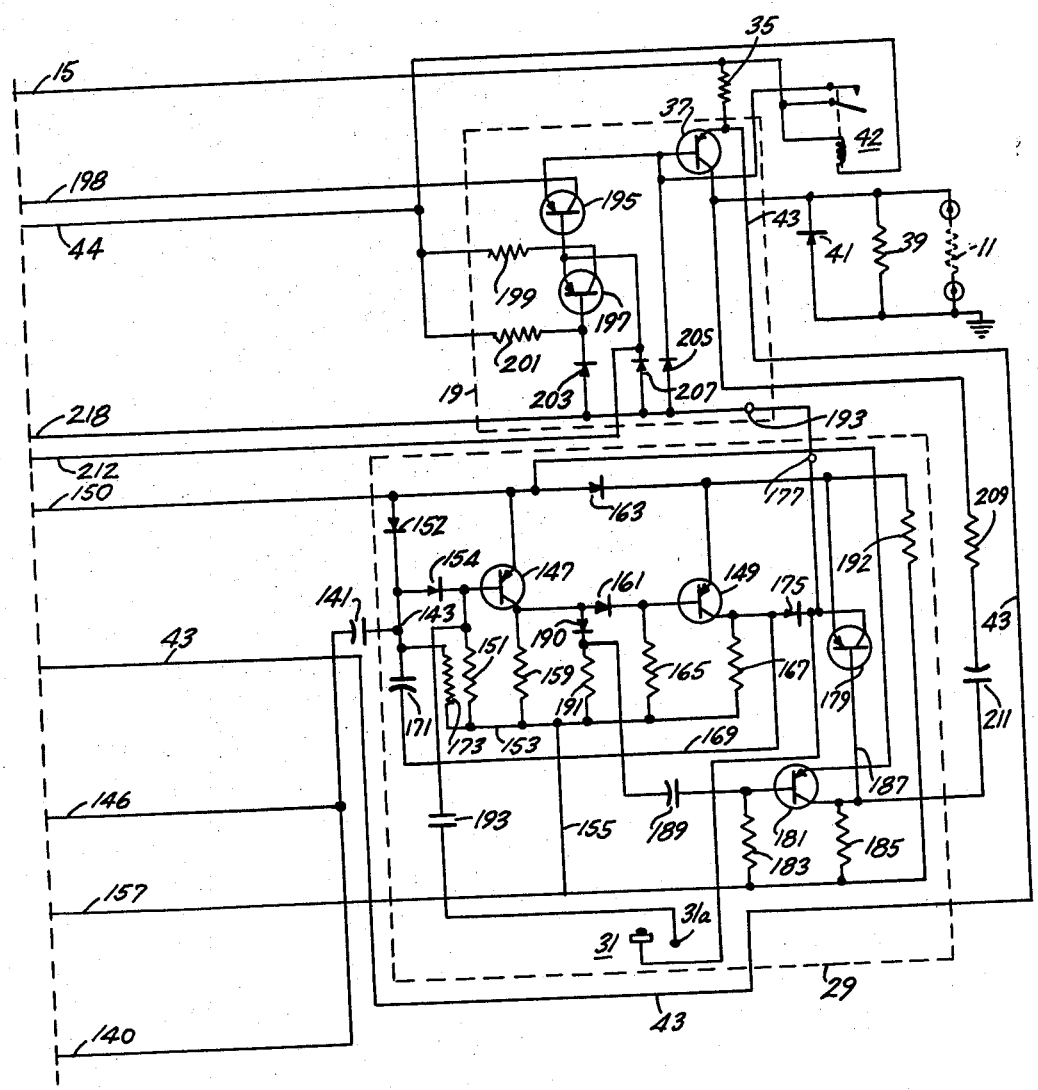

A more detailed description fo the invention is set forth in the following specification and accompanying drawings, but it should be noted that the true scope of the invention is actually set forth by the ensuing claims. In the drawings:

FIG. 1 is a block diagram of a transistorized static circuit interrupting device in accordance with the invention; and FIG 2A and 2B taken together constitute a detailed circuit diagram of a specific embodiment of a circuit interrupting device constructed in accordance with the block diagram of FIG. 1.

*Block Diagram of FIG. 1*

The transistorized static circuit interrupting device in FIG. 1 is adapted to interrupt the current supplied to a load 11 whenever it remains above a prescribed overcurrent level for longer than a prescribed delay interval. It is, in addition, adapted to interrupt the load current whenever it remains above a maximum safe overcurrent level for longer than a prescribed safe interval which is exceeded by the delay interval and also whenever the source voltage exceeds a prescribed overvoltage level.

The device comprises a power supply unit 13 having a pair of input terminals 13a and 13b to which a direct current input source (not shown) may be connected.

The negative terminal of the D.C. input source is shown connected to input terminal 13b, and may be at some potential level which has been illustrated as ground but which need not necessarily be that of the circuit breaker chassis. The positive terminal of the D.C. source is connected to input terminal 13a which is internally connected within power supply unit 11 to output terminal 13c thereof. While load 11 has been illustrated as an equivalent resistive load it in fact represents any type of transistor or other sensitive circuitry for which reliable high speed protection from voltage and current overloads and short circuits is required. Power supply unit 13 may be a conventional full wave rectifier which is transformer-connected to the A.C. supply line and which produces various filtered D.C. output voltages at respective output terminals thereof with respect to a common reference potential at output terminal 13c. Purely for illustration, these voltages have been shown as −1.5, −6, −3.5, −3 and +8 volts. For reasons which will become apparent the voltage at the −3 volt terminal is preferably regulated, e.g. by deriving it as the voltage drop across a number of serially connected silicon diodes, so as to stabilize it against variation due to changes in the load and the A.C. supply. It will be noted that because of the internal connection of terminal 13c to the positive side of the D.C. source the potential at that terminal is both the reference potential for the various D.C. supply voltages and the positive D.C. voltage of the input source with respect to ground.

The transistorized static circuit interrupting device of FIG. 1 further comprises a load current supply circuit for connecting load 11 to the D.C. input source connected to terminals 13a and 13b. Specifically, one terminal of load 11 is connected to the same ground as the negative terminal of the D.C. source. The remaining terminal of the load is connected to reference potential terminal 13c of power supply 13 by way of the load current supply circuit in question, which comprises the conductor 15, current sensing means 17, and transistor switching circuit means 19, all connected in series from terminal 13c to the load. Switching circuit means 19 is normally conductive and current sensing means 17 is of negligible resistance relative to the lowest load resistance (highest load). Current therefore normally flows freely to load 11.

Current sensing means 17 is adapted to produce a sensing voltage proportional to the load current, and is coupled to transistor triggering circuit means which is adapted to produce a trigger pulse whenever the sensing voltage has remained at a level exceeding that corresponding to the prescribed overcurrent level for longer than the prescribed delay interval referred to above. Specifically, such triggering circuit means may comprise a transistor overcurrent trigger circuit 21 coupled to current sensing means 17 and adapted to produce a gating voltage so long as the sensing voltage remains at a level exceeding that corresponding to the prescribed overcurrent level. The triggering circuit means may further comprise transistor gating circuit means coupled to trigger circuit 21 and responsive to the gating voltage to produce a trigger pulse whenever that voltage continues beyond the prescribed delay interval. Such gating circuit means may, more particularly, comprise a pulse forming circuit 23 connected to trigger circuit 21 for deriving a gating pulse from the gating voltage by translating the portion of that voltage occurring within the prescribed delay interval. The gating circuit means may also include a transistor gating circuit 25 connected to trigger circuit 21 and to pulse forming circuit 23 to receive both the gating voltage and the gating pulse, gating circuit 25 being constructed so the gating pulse holds it unresponsive to the gating voltage and so that on expiration of the gating pulse it produces a trigger pulse in response to a gating voltage which continues beyond such expiration.

In order to provide absolute protection from overcurrents of a magnitude which might cause damage if continued for as long as the prescribed delay interval for more normal overcurrent levels, the circuit interrupting device of FIG. 1 may also include override trigger pulse means whereby the load current is interrupted whenever it remains above a maximum safe overcurrent level for longer than a prescribed safe interval. Such means may be a part of the above-described triggering circuit means, which will then serve not only to produce the described normal trigger pulse whenever the sensing voltage has remained at a level exceeding that corresponding to the prescribed overcurrent level for longer than the prescribed delay interval, but will also produce an override trigger pulse whenever the sensing voltage has remained at a level exceeding that corresponding to the maximum safe overcurrent level for longer than the prescribed safe interval. More specifically, such override trigger pulse means may comprise a pulse forming circuit 26 connected to first trigger circuit 21 for deriving a disabling pulse from the gating voltage produced thereby by translating the portion of that voltage occurring within the prescribed safe interval. It may also comprise a second transistor overcurrent trigger circuit 27 coupled to current sensing means 17 and to pulse forming circuit 26 and constructed so the disabling pulse holds it unresponsive to the sensing voltage but that on expiration of the disabling pulse it produces an override trigger pulse if the sensing voltage is then at a level exceeding that corresponding to the maximum safe overcurrent level. It should be noted that even the largest prescribed overcurrent level for which first trigger circuit 21 may be set will be below the maximum overcurrent level, so that the requisite gating voltage will always be obtained therefrom on occurrence of a maximum overcurrent condition.

The transistorized static circuit interrupting device of FIG. 1 further comprises transistor signal generating circuit means 29 coupled to the triggering circuit means comprising circuits 21, 23 and 25 (and 26 and 27 if included) and responsive to the trigger pulse produced thereby to generate an overcurrent switching voltage which continues for a preset period subsequent thereto. Signal generating circuit 29 may incvlude manually operable means such as a double-throw switch 31 adapted to be selectively set to either of two states of which in one it causes the signal generating circuit means to continuously regenerate the overcurrent switching voltage until switch 31 is set to its other state. Signal generating circuit means 29 is coupled to switching circuit means 19, which is adapted to be rendered nonconductive by the switching voltage so as to open the load current circuit and maintain interruption of the load current during the preset period of that voltage. Of course, if switch 31 is set to cause continuous regeneration of the switching voltage the load current interruption will be continuously maintained until that switch is manually set to its other state.

In order to provide protection from overvoltage conditions as well as overcurrents, the circuit interrupting device of FIG. 1 may further be adapted to interrupt the load current whenever the voltage of the D.C. input source exceeds a prescribed overvoltage level. To this end, it may comprise further transistor triggering circuit means 33 coupled to the described load current supply circuit and responsive to the voltage of the input source across terminals 13a and 13b to generate an overvoltage switching voltage so long as the source voltage remains above such prescribed overvoltage level. This switching voltage is applied to switching circuit means 19 so as to render it nonconductive in the same manner as does the overcurrent switching voltage produced by signal generating means 29 under overcurrent conditions. However, the interruption due to load overvoltage is effected virtually instantaneously and is continued for as long as the overvoltage condition persists.

Assuming manual switch 31 to be set so the switching voltage produced by signal generating circuit 29 is not regenerated, current switching means 19 will again become conductive after that voltage terminates and will permit the load current to resume. However, if an overcurrent condition should then still exist the circuit interrupting device will traverse another complete current interruption cycle. The load is thus tested at intervals corresponding to the duration of the switching voltage produced by signal generating circuit 29 to determine whether an overcurrent condition still exists. This makes the complete circuit interrupting device suitable for use as a power pulse generator, since by purposely setting the prescribed overcurrent level below that of the current actually supplied to the load the current will flow in discrete pulses. These will have a duration corresponding to the prescribed overcurrent delay interval for which the triggering circuit means is set, and will be spaced at intervals equal to the preset switching voltage period.

A detailed circuit diagram of a transistorized static circuit interrupting device constructed as described is shown in FIGS. 2A and 2B taken together. Since the power supply unit 13 in FIG. 2 is the same as in FIG. 1 and may be of entirely conventional design it will not be described any further.

Current Sensing Means and Supply Circuit

The current sensing means (FIG. 2B) is simply a resistor 35 connected in series between the conductor 15 to reference voltage terminal 13c and the emitter of a PNP junction transistor 37 comprised in the transistor current switching means 19. The collector of transistor 37 is connected to the ungrounded terminal of load 11. As will be described in more detail hereinafter, transistor 37 is biased to be normally conductive. Since the resistance of sensing resistor 35 is low relative to the highest anticipated load (lowest load resistance), a complete load current supply circuit is established by which current is supplied from the D.C. source connected across input terminals 13a and 13b of power supply unit 13 and through conductor 15, resistor 35, transistor 37, and load 11 in series. A resistor 39 of considerably larger resistance than the load is connected in shunt therewith to assure continued circuit operation when a voltmeter is connected in place of the load in order to measure the open circuit load voltage, when transistor 37 is nonconductive. A normally reverse biased diode 41 is also connected in shunt with load 11 so as to dissipate any reverse transient currents which might occur during circuit interruptions with inductive loads.

In order to protect the circuit interrupting device as well as the load in case the A.C. supply should fail or be accidentally disconnected, an interlock relay 42 is provided with its operating winding connected across reference voltage conductor 15 and a conductor 44 returned to the −6 volt terminal of power supply unit 13. The relay contacts are respectively connected to conductor 15 and the base of transistor 37. During normal circuit operation the contacts remain open and have no effect thereon. However, in the event of a power failure they close and shunt resistor 35 and the emitter-to-base path in transistor 37, thereby diverting operating current from the transistor and rendering it nonconductive. This also causes interruption of the load current.

A direct voltage drop relative to the reference potential of conductor 15 will occur across current sensing resistor 35 of a magnitude proportional to the current conducted to load 11. This constitutes the current sensing voltage, which is applied via conductor 43 to the emitter of a PNP junction transistor 45 comprised in overcurrent trigger circuit 21.

Overcurrent Trigger Circuit

In the absence of any load current sensing voltage applied to the emitter of transistor 45 of trigger circuit 21 (FIG. 2A) will simply be the reference potential of power supply output terminal 13c. As the load current increases, this sensing voltage and so also the emitter potential of transistor 45 will be reduced in linear proportion thereto. The base of transistor 45 is connected via an adjustable resistor 47 to a conductor 49 which is returned via a further conductor 50 to the regulated −3 volt output terminal of power supply unit 13. The base is also connected to a resistor 51 in series with a resistor 53 which is returned to power supply reference potential terminal 13c, resistor 51 being shunted by a temperature compensating resistor 55. That is, the temperature variation of the resistance of resistor 55 is such as to compensate for temperature variation of the emitter base voltage drop of transistor 45. The base of transistor 45 is thus biased to a very accurately maintained negative level relative to the reference potential, the value of this bias voltage being adjustable by means of resistor 47. The collector of transistor 45 is returned to the regulated −3 volt conductor 49 by a resistor 57, so that current normally flows between the emitter and collector and transistor 45 is substantially in the saturated ON state. This current as well as the voltage at the collector will remain fairly constant so long as the ON state is maintained, the collector being approximately at the reference voltage level.

Overcurrent trigger circuit 21 also comprises a second transistor 59 which, together with transistor 45, forms a saturating flipflop amplifier. The base of transistor 59 is connected to the collector of transistor 45 by way of a resistor 60 in parallel with a pulse coupling capacitor 61. The emitter of this transistor is connected between a diode 63 and a resistor 65 which are in series between power supply reference potential terminal 13c and the regulated −3 volt conductor 49, thus holding the emitter at a potential somewhat below the reference level. Since this renders the emitter somewhat negative with respect to the base, transistor 59 will normally be in the OFF state. The collector is returned to conductor 49 by a resistor 57.

When the current sensing voltage falls below the level corresponding to a prescribed load overcurrent which may be set as desired by appropriate adjustment of resistor 47, the voltage at the emitter of transistor 45 will drop below that at the base and the transistor will turn OFF. Its collector voltage then sharply drops to the regulated −3 volt level of conductor 49, thus applying a negative bias to the base of transistor 59 which causes it to turn ON. The collector voltage thereof then rises to that at the emitter, and is applied back via conductors 68 and 69 to the parallel combination of a resistor 71 and pulse coupling capacitor 73 connected to the base of transistor 45 so as to maintain that transistor in the OFF state. The trigger circuit will remain in this condition until the load current drops back below the selected overcurrent level, at which time the sensing voltage will again become more positive than the base bias voltage of transistor 45. That transistor then turns ON again and so turns transistor 59 OFF.

From the foregoing it is plain that trigger circuit 21 produces a negative overcurrent trigger voltage at the collector of transistor 45 and a positive overcurrent trigger voltage at the collector of transistor 59. The negative trigger voltage is brought out to trigger circuit output terminal 77, and serves as a negative gating voltage such as referred to above. The accompanying positive trigger voltage is brought out to another output terminal 79, and serves as a positive gating voltage also as previously referred to.

Break Delay Pulse Forming Circuit

The positive gating voltage at output terminal 79 of trigger circuit 21 is applied across a diode 81 in series with a resistor 83 connected to the regulated −3 volt conductor 50 and which are contained within break delay pulse forming circuit 23 (FIG. 2A). The positive gating voltage is thus produced at the junction of those two circuit elements. This junction is connected to one terminal of each of three capacitors 85, 87 and 89, which may have capacitances in some convenient progression such as 0.3 mf., 3 mf. and 30 mf. The other terminal of each of these capacitors is connected to respective contacts of a manually operable three-position single-pole switch 91, the slider of which is connected to the base of a PNP junction transistor 93. The slider is also connected by a variable resistor 95 to the regulated −3 volt conductor 50. Resistor 95 may be variable over a 10:1 range, so that the various steps of switch 91 together with adjustment of resistor 95 makes it possible to obtain any capacitive discharge time constant over a wide range which may be from about 100 microseconds to 100 milliseconds.

Resistor 95 also serves to supply the base of transistor 93 with the −3 volt potential of conductor 50. The collector of that transistor is connected by a diode 97 and a resistor 99 in series to the same conductor 50. Since the emitter is returned via a conductor 101 to diode 63 connected to reference potential terminal 13c, transistor 93 is biased to be normally ON with its collector nearly at the reference potential level. The base thereof will also be nearly at that level, thus charging the one of capacitors 85, 87 and 89 to which the slider of switch 91 is set.

When trigger circuit 21 begins producing the positive gating voltage at terminal 79 that voltage will be transmitted to the base of transistor 93 via the one of capacitors 85, 87 and 89 to which switch 91 is set. This causes transistor 93 to turn OFF. However, after a time interval determined by the capacitive discharge time constant of the capacitor in question the capacitor will have discharged sufficiently to permit transistor 93 to revert to the ON state. During the time it is OFF the voltage at its collector will be substantially at the regulated −3 volt level of conductor 50. When the ON state is resumed the collector voltage will return to its quiescent level near the reference potential. This collector voltage pulse constitutes the output of break delay pulse forming circuit 23, and is made available at output terminal 103 thereof. Thus, this circuit serves to convert the gating voltage produced by triggering circuit 21 to a negative gating pulse by transmitting only that portion of the gating voltage occurring within the prescribed overcurrent delay interval selected by the setting of switch 91 and the adjustment of resistor 95.

Delay Gating Circuit

The negative gating voltage produced at output terminal 77 of trigger circuit 21 is applied via a conductor 105 and a resistor 107 to the base of a PNP junction transistor 109 comprised within delay gating circuit 25 (FIG. 2A). The collector of this transistor is connected to the regulated −3 volt conductor 50 by a resistor 110, and the emitter is connected to output terminal 103 of pulse forming circuit 23. As described, during the prescribed overcurrent delay interval a negative gating pulse is produced at the emitter terminal of transistor 109 of about the −3 volt level of conductor 50. Since this is also the level of the negative gating voltage produced by trigger circuit 21, transistor 109 remains OFF during the gating pulse interval. However, after the expiration of that interval transistor 93 in pulse forming circuit 23 reverts to its normally ON state and the voltage at terminal 103 thereof will rise nearly to the reference potential level. If the gating voltage is still persisting at that time, as it will be if there is still a load overcurrent, the net bias between the emitter and base of transistor 109 will be in the forward direction and it will turn ON, thereby producing a positive pulse at output terminal 111 connected to its collector.

Delay Override Pulse Forming and Trigger Circuits

In order to prevent damage from large overcurrents which might cause damage if continued for as long as the predetermined delay interval set by pulse forming circuit 23, the complete triggering circuit means may include an additional pulse forming circuit 26 and an additional trigger circuit 27 (FIG. 2A). The latter may be of the same type as trigger circuit 21, comprising a normally ON transistor 113 and a normally OFF transistor 115. To this end, the base of transistor 113 is connected to a voltage divider comprising a variable resistor 117 and a fixed resistor 119 connected in series between a diode 121 which returns to the reference potential terminal 13c and the conductor 49 which returns to the regulated −3 volt potential. The collector of transistor 113 is also connected to conductor 49 by a resistor 123, while the emitter is connected to current sensing voltage conductor 43. Resistor 117 may be adjusted so that transistor 113 remains conductive in the saturated ON state until the sensing voltage drops considerably below the level at which the first trigger circuit 21 is caused to change its state. That is, transistor 113 will remain conductive until the sensing voltage goes beyond the level corresponding to a prescribed maximum safe overcurrent level selected by the adjustment of resistor 117. When turn OFF occurs the collector of transistor 113 will drop from its quiescent level near the reference potential to the regulated −3 volt level. This collector is connected by a resistor 125 to the base of transistor 115, the emitter of which is connected to conductor 101 returning via diode 63 to the reference potential terminal 13c. The collector of transistor 115 is connected to the regulated −3 volt conductor 49 by a resistor 129. This transistor is therefore normally biased in the OFF state, but turns ON when the collector voltage of transistor 113 drops as described on occurrence of a load current exceeding the prescribed maximum safe value. The collector voltage of transistor 115 then rises substantially to the reference potential level, and is fed back via a resistor 131 to the base of transistor 113 to hold the latter in the OFF state while such an overcurrent condition exists.

As described up to this point, override trigger circuit 27 would change state almost instantaneously on occurrence of a load current exceeding the prescribed maximum safe overcurrent level. This would make no allowance for short duration transient conditions which actually could not cause damage. Accordingly, the operation of override trigger circuit 27 is delayed for a specified safe interval after occurrence of a maximum overcurrent condition by the provision of the additional pulse forming circuit 26 (FIG. 2A) which, as illustrated, may simply be a capacitor 133. Capacitor 133 is connected between diode 81 coupled to negative gating voltage output terminal 79 of overcurrent trigger circuit 21 and another diode 135 coupled to the base of normally OFF transistor 115 in override trigger circuit 27. Inasmuch as the selected maximum safe overcurrent for which resistor 117 is set will exceed the highest normal overcurrent corresponding to the setting of resistor 47 in trigger circuit 21, the latter will always produce a gating voltage as soon as the overcurrent condition referred to comes about. The positive gating voltage produced at terminal 79 is conducted through diode 81 to capacitor 133 and thence through diode 135 to the base of transistor 115 to maintain it in the OFF state in spite of the fact that transistor 113 may have been turned OFF by the current sensing voltage. This condition is maintained until capacitor 133 discharges through resistors 125 and 123, having previously been charged through resistor 83 in the path comprising a diode 137 connected to conductor 101 returned to the reference potential terminal 13c, as previously described. By appropriate choice of the capacitance of capacitor 133 and the series resistance of resistors 125 and 123, a discharge time constant may be obtained which permits transistor 115 to turn ON after the prescribed maximum safe overcurrent delay interval. When that occurs, transistor 115 turns ON and produces a positive trigger pulse at its collector somewhat under the reference voltage level. This pulse is made available at output terminal 139 connected to the collector.

Output terminal 111 of delay gating circuit 25 connected by a conductor 140 to a capacitor 141 coupled to input terminal 143 of the transistor signal generating circuit means 29 (FIG. 2B), so that the positive-going trigger pulse produced at terminal 111 under the described overcurrent condition is applied to terminal 143. Output terminal 139 of transistor override trigger circuit 27 is also coupled to capacitor 141 by a diode 145 and conductor 146, so that the positive-going override trigger pulse produced at terminal 139 as a result of a maximum safe overcurrent condition is also applied to terminal 143. Note that a given overcurrent condition can only result in one trigger pulse being applied to that terminal, since if the overcurrent condition is below the maximum safe value no trigger pulse will be produced at terminal 139 while if it is above such maximum safe value no trigger pulse will be produced at terminal 111. The reason for the latter statement is that if the prescribed maximum overcurrent delay interval is exceeded by the normal overcurrent delay interval the circuit interrupting device interrupts the load current before the time at which a normal trigger pulse would otherwise have been produced at terminal 111. On the other hand, if the normal overcurrent interval should be shorter than that corresponding to the maximum safe overcurrent the load current will be interrupted before an override trigger pulse would otherwise have been produced at terminal 139. The normal and override trigger pulses therefore can only occur in the alternative.

*Signal Generating Means*

Signal generating means 29 (FIG. 2B) includes a first monostable transistor multivibrator comprising transistors 147 and 149, the stable state of this multivibrator being with transistor 147 ON and transistor 149 OFF. To this end, the emitter of transistor 147 is connected to the +8 volt output terminal of power supply unit 13 by a conductor 150, and its base is connected by a resistor 151 and conductors 153, 155 and 157 to the −3.5 volt output terminal of power supply unit 13. The collector is returned to conductor 153 by a resistor 159. Transistor 147 is thus biased normally ON, in which state its collector voltage will be only slightly less positive than the voltage applied to the emitter. The collector of transistor 147 is connected by a diode 161 to the base of transistor 149 so that while it is ON its collector places the base of transistor 149 also at nearly +8 volts. The emitter of the latter transistor is connected to the +8 volt conductor 150 by a diode 163, a base return path being provided by a resistor 165 connected to conductor 153. The collector of transistor 149 is also returned to conductor 153 by a resistor 167 and is further connected by a feedback conductor 169 and timing capacitor 171 to the signal generator input terminal 143.

While the first multivibrator in signal generating circuit 29 is in its quiescent state, as described, input coupling capacitor 141 will charge up in the path comprising conductor 150 and a diode 152 connected to input terminal 143, the other side of the capacitor being returned to the −3 volt conductor 50 by the resistor 110 in delay gating circuit 25. A positive-going normal trigger pulse at terminal 111 or override trigger pulse at terminal 139 will then be conveyed by capacitor 141 to input terminal 143 and thence via a diode 154 to the base of transistor 147, causing it to turn OFF. A resistor 173 is preferably shunted across input terminal 143 and conductor 153 in order to reduce the pulse response sensitivity of signal generating circuit 29 to spurious power supply fluctuations. Upon turning OFF, the collector voltage of transistor 147 will sharply drop to substantially the −3.5 volt level of conductor 153, causing the base of transistor 149 to also drop substantially to that level. Transistor 149 therefore turns ON and its collector voltage rises substantially to +8 volts. Via diode 175 this positive voltage is brought to output terminal 177. At the same time, it is translated by conductor 169, capacitor 171 and diode 154 to the base of transistor 147 to maintain the latter transistor OFF. Eventually, however, capacitor 171 will discharge in the path through diode 154 and resistor 151 to conductor 153 having previously been charged in the path including diode 152, conductor 169, resistor 167 and conductor 153. The voltage at the side of the capacitor connected to diode 154 therefore gradually drops and after a time governed by the time constant of capacitor 171 and resistor 151 reaches a level at which transistor 147 again reverts to the ON state. This causes transistor 149 to again turn OFF, terminating the positive voltage which the first multivibrator had been producing at output terminal 177.

The signal generating circuit 29 further comprises a second monostable transistor multivibrator including a normally OFF transistor 179 and a normally ON transistor 181. Specifically, the emitter of transistor 181 is connected to the +8 volt conductor 150 and the base is connected by a resistor 183 to the −3.5 volt conductor 157. The collector is also returned to the latter conductor by a resistor 185. In the ON state the collector voltage will be only slightly below +8 volts, and maintains transistor 179 OFF by virtue of the connection 187 to the base thereof. The emitter of transistor 179 is connected to the emitter of transistor 149 to receive the same emitter supply potential. The collector of transistor 179 is connected to output terminal 177, and so via diode 175 receives the collector voltage of transistor 149 in the first multivibrator.

The base of normally ON transistor 181 in the second multivibrator is coupled by a capacitor 189 to a diode 190 connected to the collector of transistor 147 in the first multivibrator, the junction of diode 190 and capacitor 189 being returned to the −3.5 volt conductor 153 by a resistor 191. While transistor 147 is in the quiescent ON state the positive voltage at its collector is conveyed by diode 190 to capacitor 189. During this time capacitor 189 will not charge since both of its terminals are at +8 volts. When an overcurrent trigger pulse causes transistor 147 to switch to the OFF state, as described above, its collector voltage sharply drops. Capacitor 189 then charges through resistor 191. After the first multivibrator has completed its unstable operating period, determined by the discharge time constant of capacitor 171 and resistor 151, the return of transistor 147 to the ON state results in a positive potential at its collector which is conveyed via diode 190, and capacitor 189 to the base of transistor 181 in the second multivibrator. This causes it to turn OFF, with a sharp drop in its collector voltage which results in the associated transistor 179 turning ON. The latter then produces a positive voltage at its collector of substantially the same amplitude as that which had been produced at the collector of transistor 149 while the first multivibrator was in its unstable state. Accordingly, an essentially continuous positive switching voltage continues to be maintained at output terminal 177. The second multivibrator remains in the unstable state until capacitor 189 discharges again and permits the base voltage of transistor 181 to drop sufficiently to permit that transistor to turn ON once more. The rise in its collector voltage will then drive the base of transistor 179 positive, causing it to turn OFF and terminating the positive voltage which had been produced up to that time at output terminal 177. It will be noted that the emitters of both normally ON transistors 147 and 181 are connected at the higher potential side of diode 163 connected to the +8 volt conductor 150, the other side of that diode being returned by a resistor 192 to the −3.5 volt conductor 157. The emitters of the normally OFF transistors 149 and 179 are connected to the junction of diode 163 and resistor 191, thus effecting a slight degree of voltage division which results in supplying those emitters with slightly lower potentials than the emitters of the normally ON transistors.

A feature of the foregoing construction of signal generator 29 is that the period during which the second multivibrator comprising transistors 179 and 181 remains in its unstable state is sufficient to permit the first multivibrator comprising transistors 147 and 149 to completely return to its quiescent stable state before another overcurrent condition is permitted to occur. Specifically, the overcurrent switching voltage produced at output terminal 177 of signal generating circuit 29 is effective to maintain current switching means 19 nonconductive during the entire interval of that voltage. If both of the multivibrators in generating circuit 29 have the same unstable durations, half of the total interval of the load current interruption so effected will be available for recovery of the first multivibrator included therein. Thus, in spite of the relatively long time delay which the signal generating circuit must provide in order to give the desired load current interruption period it is able to respond almost instantaneously to the trigger pulse which will be applied thereto at the end of such interval if an overcurrent condition is then still persisting.

A further feature of signal generating circuit 29 is that it may include manually operable means adapted to be selectively set in either of two states of which in one the circuit continuously regenerates the over-current switching voltage at its output terminal 177. This will result in continuously maintaining interruption of the load current until such manually operable means is set to its opposite state. As shown in FIG. 2B such manually operable means may simply be a single-pole double-throw switch 31 which, when closed to its contact 31a, couples the second multivibrator comprising transistors 179 and 181 to the first multivibrator comprising transistors 147 and 149. The coupling path is from the collector of normally OFF transistor 179, through contact 31a, and to the base of normally ON transistor 147 via a coupling capacitor 193. As before, when transistor 147 returns from the OFF to the ON state, at the end of the unstable period of the first multivibrator, the positive pulse produced at its collector will cause transistor 181 in the second multivibrator to turn OFF and transistor 179 therein to turn ON. Now, however, the positive pulse produced at that time at the collector of transistor 179 is translated through switch 31 and capacitor 193 to the base of transistor 147 and causes it to immediately turn OFF again. This means that by the time the second multivibrator completes its unstable period and transistor 181 returns from the OFF to the ON state transistor 147 in the first multivibrator will virtually simultaneously be returning from its OFF to its ON state. A positive pulse is therefore delivered to the base of transistor 181 to immediately return it to the OFF state. Snice all these events occur virtually instantaneously, the net result is that both multivibrators maintain each other substantially continuously in the unstable state. A continuous switching voltage will therefore be produced at terminal 177 until switch 31 is manually operated to open its contact 31a. That will permit both multivibrators to return to their quiescent states.

Switching Circuit

The switching voltage produced at output terminal 177 of signal generating circuit 29 is applied to input terminal 193 of transistor switching circuit 19 (FIG. 2B), which includes the PNP power transistor 37 connected in series with current sensing resistor 35 and load 11 as described previously. The function of switching circuit 19 is to render transistor 37 nonconductive so long as the switching voltage (which is nearly +8 volts) is supplied to terminal 193. Since the base input impedance of transistor 37 will be quite low, a pair of emitter follower PNP transistors 195 and 197 of lower power rating are provided for driving the base of transistor 37. Specifically, the base of transistor 37 is connected to the emitter of transistor 195 and the collector of the latter is returned by a conductor 198 to the −1.5 volt output terminal of power supply unit 13. The base current of transistor 37 is therefore the emitter current of transistor 195. Similarly, the base of transistor 195 is connected to the emitter of transistor 197 and the collector of the latter is returned via a small resistance 199 to the −6 volt conductor 44. The base current of transistor 195 is therefore the emitter current of transistor 197. Base current for maintaining transistor 197 normally ON, and therefore also keeping transistors 195 and 37 ON, is supplied by a resistor 201 connecting the base to conductor 44.

Application of the positive switching voltage to input terminal 193 will drive the base of transistor 197 positive with respect to the emitter, the connection thereto being by way of a diode 203 which provides isolation from terminal 193 when no switching voltage is present thereat. Transistor 197 therefore turns OFF, interrupting its emitter current and so also the base and emitter currents of transistors 195 and 37. The load current circuit is thereby opened. A pair of diodes 205 and 207 respectively connected between switching circuit input terminal 193 and the bases of transistors 37 and 195 provide paths for the reverse saturation currents of those transistors when in the OFF state, thus isolating those currents from transistor 197 and assuring that it remains OFF.

A feature of this circuit is the series connection of a resistor 209 and capacitor 211 between the collector of transistor 37 and the base of normally OFF transistor 179 in signal generating circuit 29. This provides regenerative feedback whereby when the switching voltage begins to terminate, transistor 179 returning to the OFF state and transistor 37 beginning to turn ON again, the positive pulse at the collector of the latter is conveyed to the base of transistor 179 to cause it to turn OFF more rapidly. This in turn, causes transistor 37 to turn fully ON more rapidly. That transistor therefore returns from the OFF to the fully ON state virtually instantaneously with termination of the unstable period of the second multivibrator in signal generating circuit 29.

A further feature of switching circuit 19 is the series connection via a conductor 212 of a capacitor 213 and resistor 215 between the emitter of transistor 197 and the base of transistor 45 in overcurrent trigger circuit 21. This serves to compensate for the effects of output voltage regulation of power supply unit 13 when transistor 37 returns from the OFF to the ON state, and load current resumes. At that time transistor 197 will change from the OFF to the ON state, resulting in a negative voltage change at its emitter which is conveyed by the connection described to the base of transistor 45 for a brief interval determined by the charge time constant of capacitor 213 and resistor 215. This negative pulse maintains transistor 45 in the ON state during such interval thus effectively desensitizing it to power supply voltage fluctuations until the effects of the sudden resumption of load current have stabilized.

Overvoltage Trigger Circuit

In order to protect the load from possible damage if the input voltage applied across input terminals 13a and 13b of power supply unit 13 should become excessive, the complete circuit interrupting device may also comprise the overvoltage triggering circuit 33 (FIG. 2A). This circuit has an output terminal 217 connected by a conductor 218 to input terminal 193 of load current switching circuit 19. During an overvoltage condition it supplies a switching voltage to terminal 193 of the same type as the overcurrent switching voltage which is provided by signal generating circuit 29 during an overcurrent condition as described above. Overvoltage trigger circuit 33 may comprise a pair of PNP junction transistors 219 and 221 of which transistor 219 is biased to be normally in the ON state. Specifically, the emitter thereof is connected to the junction of a pair of resistors 223 and 225 connected in series between the +8 volt supply conductor 150 and the ground return of input voltage terminal 13b. The base of transistor 219 is connected to the junction of a diode 227 and resistor 229 also serially connected between conductor 150 and ground. The voltage division thus established at the emitter is normally less than that at the base, so that the emitter is more positive than the base. The collector is returned to ground by a resistor 231, and is also connected to the base of transistor 221. While transistor 219 is ON the voltage at its collector will render the base of transistor 221 more positive than that supplied to its emitter, which is derived at the junction of a diode 233 and a pair of resistors 235 and 225 in series between conductor 150 and ground. Transistor 221 is thus normally OFF.

Since the voltage drop across diode 227 remains substantially constant, as the direct input voltage supplied across power supply terminals 13a and 13b increases the voltage division across resistors 223 and 225 will eventually result in the emitter of transistor 219 becoming negative with respect to its base. That transistor then turns OFF and its collector voltage drops substantially to ground level. Transistor 221 therefore turns ON. This effectively places resistors 235 and 231 in shunt with resistor 225, thus still further reducing the emitter voltage of transistor 219 to maintain it in the OFF state. In addition, the collector voltage of transistor 221 rises to substantially the +8 volt level (with respect to the reference potential at power supply terminal 13a) and by the connection thereof to output terminal 217 supplies the requisite overvoltage switching voltage to that terminal to cause load current switching circuit 19 to interrupt the load current as described previously. Trigger circuit 33 will reset when the direct input voltage across terminals 13a and 13b of power supply unit 13 drops slightly below the level at which triggering operation occurs. Resistor 223 may be variable so as to cause triggering to occur at a prescribed load overvoltage level.

Typical Specifications

A specific circuit interrupting device as described was constructed for use with a direct input voltage source supplying between 6 and 32 volts and adapted to interrupt any load current over a range from 2 to 30 amperes with any selected break delay time between 100 microseconds and 100 milliseconds. An override delay time of 4 milliseconds was established for overcurrents in excess of 30 amperes. Signal generating circuit 29 was designed to provide load current interruption periods of approximately 2 seconds, while overvoltage trigger circuit 33 was preset to operate when the direct input voltage reached 40 volts. However, by adjustment of resistor 223 this level could be altered to any value within the range of 6 to 60 volts. It was found that after the selected break delay interval load current interruption occurred within 1 microsecond for an overcurrent level of 2 amperes, 10 microseconds for an overcurrent level of 10 amperes, and 20 microseconds for an overcurrent level of 20 amperes. The circuit values employed in this specific construction were as follows:

| Resistor: | Ohms | Resistor: | Ohms |
| --- | --- | --- | --- |
| 39 | 1000 | 151 | 10,000 |
| 47 | 120 | 159 | 1000 |
| 51 | 12 | 165 | 1000 |
| 53 | 20 | 167 | 1000 |
| 55 | 100 | 173 | 470,000 |
| 57 | 100 | 183 | 10,000 |
| 60 | 1000 | 185 | 4700 |
| 65 | 1000 | 191 | 4700 |
| 71 | 510 | 192 | 1000 |
| 83 | 220 | 199 | 33 |
| 95 | 560 to 5560 | 201 | 2000 |
| 99 | 470 | 209 | 10,000 |
| 107 | 2200 | 215 | 5000 |
| 110 | 1000 | 223 | 150 |
| 117 | 0 to 325 | 225 | 4700 |
| 125 | 1000 | 229 | 10,000 |
| 129 | 220 | 231 | 10,000 |
| 131 | 1000 | 235 | 220 |

| Capacitor: | Microfarads | Capacitor: | Microfarads |
| --- | --- | --- | --- |
| 61 | .01 | 141 | 47.0 |
| 73 | .02 | 171 | 150 |
| 85 | .3 | 189 | 150 |
| 87 | 3.0 | 193 | .01 |
| 89 | 30.0 | 211 | 1.0 |
| 133 | 3.3 | 213 | 1.0 |

What is claimed is:

1. A transistorized static circuit interrupting device for interrupting the current supplied to a load whenever it remains above a prescribed overcurrent level for longer than a prescribed delay interval, comprising: a load current supply circuit for connecting said load to a direct current input source; current sensing means in said current supply circuit for producing a sensing voltage proportional to the load current; a transistor overcurrent trigger circuit coupled to said current sensing means adapted to produce a gating voltage so long as the sensing voltage remains at a level exceeding that corresponding to said prescribed overcurrent level; a pulse forming circuit connected to said trigger circuit for deriving a gating pulse from said gating voltage by translating the portion of that voltage occurring within said prescribed delay interval; a transistor gating circuit connected to said trigger circuit and to said pulse forming circuit to receive both said gating voltage and said gating pulse, said gating circuit being constructed so the gating pulse holds it unresponsive to the gating voltage and so that on expiration of the gating pulse it produces a trigger pulse in response to a gating voltage which continues beyond such expiration; a transistor signal generating circuit connected to said gating circuit and adapted to respond to said trigger pulse to generate an overcurrent switching voltage which continues for a preset period subsequent thereto; and normally conductive transistor switching circuit means in said load current supply circuit and coupled to said signal generating circuit means, said switching circuit means being adapted to be rendered nonconductive by said switching voltage so as to open the load current circuit and maintain interruption of the load current during said preset period.

2. A transistorized static circuit interrupting device for interrupting the current supplied to a load whenever it remains above a prescribed overcurrent level for longer than a prescribed delay interval and also whenever it remains above a maximum safe overcurrent level for longer than a prescribed safe interval which is exceeded by said delay interval, comprising: a load current supply circuit for connecting said load to a direct current input source; current sensing means in said current supply circuit for producing a sensing voltage proportional to the load current; a first transistor overcurrent trigger circuit coupled to said current sensing means adapted to produce a gating voltage so long as the sensing voltage remains at a level exceeding that corresponding to said prescribed overcurrent level; transistor gating circuit means coupled to said trigger circuit responsive to said gating voltage to produce a normal trigger pulse whenever that voltage continues beyond said prescribed delay interval; a pulse forming circuit connected to said first trigger circuit for deriving a disabling pulse from said gating voltage by translating the portion of that voltage occurring within said prescribed safe interval; a second transistor overcurrent trigger circuit coupled to said current sensing means and to said pulse forming circuit to receive both said sensing voltage and said disabling pulse, said second trigger circuit being constructed so the disabling pulse holds it unresponsive to the sensing voltage and so that on expiration of the disabling pulse it produces an override trigger pulse in response to a sensing voltage which is then at a level exceeding that corresponding to said maximum safe overcurrent level; a transistor signal generating circuit coupled to each of said gating circuit means and said second trigger circuit responsive to each trigger pulse produced thereby to generate an overcurrent switching voltage which continues for a preset period subsequent thereto; and normally conductive transistor switching circuit means in said load current supply circuit and coupled to said signal generating circuit means, said switching means being adapted to be rendered nonconductive by said switching voltage so as to open the load current circuit and maintain interruption of the load current during said preset period.

3. A transistorized static circuit interrupting device for interrupting the current supplied to a load from a direct current input source whenever the current remains above a prescribed overcurrent level for longer than a prescribed delay interval and whenever it exceeds a maximum safe overcurrent level for longer than a prescribed safe interval which is exceeded by said delay interval, and also whenever the source voltage exceeds a prescribed overvoltage level, comprising: a load current supply circuit for connecting said load to said direct current input source; current sensing means in said current supply circuit for producing a sensing voltage proportional to the load current; transistor triggering circuit means coupled to said current sensing means adapted to produce a normal trigger pulse whenever the sensing voltage has remained at a level exceeding that corresponding to said prescribed overcurrent level for longer than said prescribed delay interval and to produce an override trigger pulse whenever that voltage has remained at a level exceeding that corresponding to said maximum safe overcurrent level for longer than said prescribed safe interval; transistor signal generating circuit means coupled to said triggering circuit means responsive to each trigger pulse produced thereby to generate an overcurrent switching voltage which continues for a preset period subsequent thereto; normally conductive transistor switching circuit means in said load current supply circuit and coupled to said signal generating circuit means, said switching circuit means being adapted to be rendered nonconductive by said switching voltage so as to open the load current circuit and maintain interruption of the load current during said preset period; further transistor triggering circuit means coupled to said load current supply circuit and responsive to the voltage across said input source to generate an overvoltage switching voltage so long as the source voltage remains above said prescribed overvoltage level; and means coupled to said further triggering means for applying said overvoltage switching voltage to said switching circuit means so as to render it nonconductive, thereby opening the load current circuit and interrupting the load current for the duration of said overvoltage switching voltage.

4. A transistorized static circuit interrupting device for interrupting the current supplied to a load from a direct current input source whenever it remains above a prescribed overcurrent level for longer than a prescribed delay interval and also whenever the source voltage exceeds a prescribed overvoltage level, comprising: a load current supply circuit for connecting said load to said direct current input source; current sensing means in said current supply circuit for producing a sensing voltage proportional to the load current; transistor triggering circuit means coupled to said current sensing means adapted to produce a trigger pulse whenever the sensing voltage has remained at a level exceeding that corresponding to said prescribed overcurrent level for longer than said prescribed delay interval; transistor signal generating circuit means coupled to said triggering circuit means responsive to said trigger pulse to generate an overcurrent switching voltage which continues for a preset period subsequent thereto; normally conductive transistor switching circuit means in said load current supply circuit and coupled to said signal generating circuit means, said switching circuit means being adapted to be rendered nonconductive by said overcurrent switching voltage so as to open the load current circuit and maintain interruption of the load current during said preset period; further transistor triggering circuit means coupled to said load current supply circuit and responsive to the voltage across said input source to generate an overvoltage switching voltage so long as the source voltage remains above said prescribed overvoltage level; means coupled to said further triggering circuit means for applying said overvoltage switching voltage to said switching circuit means so as to render it nonconductive, thereby opening the load current circuit and interrupting the load current for the duration of said overvoltage switching voltage; and manually operable means comprised in said signal generating circuit means adapted to be selectively set to either of two states of which in one it causes said signal generating circuit means to continuously regenerate said overcurrent switching voltage, thereby continuously maintaining the load current interruption until said manually operable means is set to its other state.

5. A transistorized static circuit interrupting device for interrupting the current supplied to a load whenever it remains above a prescribed overcurrent level for longer than a prescribed delay interval, comprising: a load current supply circuit for connecting said load to a direct current input source; current sensing means in said current supply circuit for producing a sensing voltage proportional to the load current; transistor triggering circuit means coupled to said current sensing means adapted to produce a trigger pulse whenever the sensing voltage has remained at a level exceeding that corresponding to said prescribed overcurrent level for longer than said prescribed delay interval; signal generating circuit means including a first monostable transistor multivibrator coupled to said triggering circuit means adapted to respond to said trigger pulse to enter an unstable operating state from which it recovers after a first preset period during which it generates a first overcurrent switching voltage; a second monostable transistor multivibrator in said signal generating circuit means coupled to said first monostable transistor multivibrator adapted to respond to termination of said first overcurrent switching voltage to enter an unstable operating state from which it recovers after a second preset period during which it generates a second overcurrent switching voltage, said second period being sufficient to permit complete recovery of said first multivibrator; and normally conductive transistor switching circuit means in said load current supply circuit and coupled to each of said transistor multivibrators, said switching circuit means being adapted to be rendered nonconductive by said first and second switching voltages successively during said first and second periods, thereby opening the load current circuit and maintaining interruption of the load current for a period equal to the sum of said first and second periods.

6. A transistorized static circuit interrupting device for interrupting the current supplied to a load whenever it remains above a prescribed overcurrent level for longer than a prescribed delay interval, comprising: a load current supply circuit for connecting said load to a direct current input source; current sensing means in said current supply circuit for producing a sensing voltage proportional to the load current; transistor triggering circuit means coupled to said current sensing means adapted to produce a trigger pulse whenever the sensing voltage has remained at a level exceeding that corresponding to said prescribed overcurrent level for longer than said prescribed delay interval; signal generating circuit means including a first monostable transistor multivibrator coupled to said triggering circuit means adapted to respond to said trigger pulse to enter an unstable operating state from which it recovers after a first preset period during which it generates a first overcurrent switching voltage; a second monostable transistor multivibrator in said signal generating circuit means coupled to said first monostable transistor multivibrator adapted to respond to termination of said first overcurrent switching voltage to enter an unstable operating state from which it recovers after a second preset period during which it generates a second overcurrent switching voltage, said second interval being sufficient to permit complete recovery of said first multivibrator; a manually operable switch adapted to be selectively set to either of two states of which in one it couples said second multivibrator to said first multivibrator so that termination of said second overcurrent switching voltage causes the first multivibrator to re-enter its unstable operating state, whereby both multivibrators successively cause each other to produce said first and second overcurrent switching voltages in alternation; and normally conductive transistor switching circuit means in said load current supply circuit and coupled to each of said transistor multivibrators, said switching circuit means being adapted to be rendered nonconductive by said first and second switching voltages successively during said first and second intervals, thereby keeping the load current circuit open and continuously maintaining interruption of the load current until said manually operable switch is set to its other state wherein it removes said further coupling between said second multivibrator and said first multivibrator.

References Cited in the file of this patent
UNITED STATES PATENTS

| | | |
|---|---|---|
| 2,659,008 | Floyd | Nov. 10, 1953 |
| 2,809,293 | Rambo et al. | Oct. 8, 1957 |
| 2,963,637 | Osborn | Dec. 6, 1960 |
| 3,001,100 | Schuh et al. | Sept. 19, 1961 |
| 3,037,158 | Schmidt | May 29, 1962 |
| 3,049,632 | Stapler | Aug. 14, 1962 |